March 2, 1954 — H. WIRZ — 2,670,602
ROTARY TURBINE-TYPE HYDRAULIC COUPLING
Filed June 8, 1948 — 2 Sheets-Sheet 1

INVENTOR.
HENRY WIRZ
BY
ATTORNEY

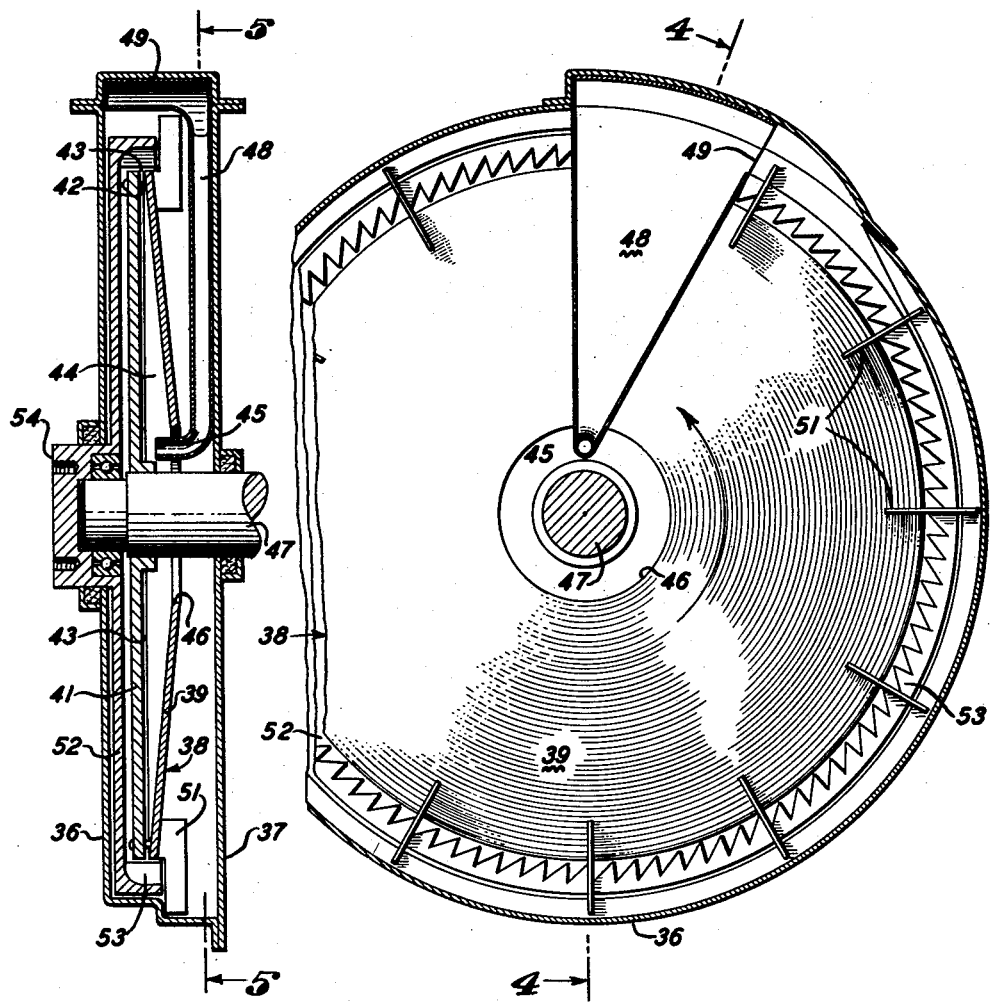

UNITED STATES PATENT OFFICE 2,670,602

ROTARY TURBINE-TYPE HYDRAULIC COUPLING

Henry Wirz, Long Beach, Calif.

Application June 8, 1948, Serial No. 31,775

11 Claims. (Cl. 60—54)

(Granted under Title 35, U. S. Code (1952), sec. 266)

This invention relates to power transmitting devices, and more particularly to hydraulic power transmitting devices. Exemplary uses for this invention are as a transmission in an automobile, truck, tractor, or in any case where a device is required to absorb the initial load, to overcome inertia, and to prevent sudden load shocks.

It is an object of this invention to provide a hydraulic power transmission which is simple in construction and which can be economically manufactured.

Another object of this invention is to provide a hydraulic power transmitting device in which the speed of the prime mover can be maintained constant while the load is varied over a wide range.

Another object of this invention is to provide a hydraulic power transmitting device in which any initial coupling shock will be absorbed.

A further object of this invention is to provide a hydraulic power transmitting device in which the coupling varies with the torque transmitted.

A still further object of this invention is to provide a hydraulic power transmitting device in which the coupling can be increased or decreased at will by external control means.

It is a further object of this invention to provide a hydraulic transmission which is substantially unidirectional in its torque transmitting properties.

Other objects and many of the attendant advantages of this invention will be readily appreciated as the same becomes better understood by reference to the following detailed description.

The apparatus of this invention comprises generally a fluid housing for containing a liquid, an impeller mounted on a driving shaft in the housing, the impeller being formed of a pair of axially spaced circular members connected at their circumference by an annular member, thus forming an impeller chamber. The annular member is provided with openings to permit the discharge of fluid from the impeller chamber. On a driven shaft mounted in the housing coaxially with the driving shaft is threaded a rotor. A circular member of the rotor is adjacent one wall of the impeller. A flange mounted on the circular member of the rotor extends over the annular connecting member of the impeller. This flange is provided with vanes which react to the fluid discharged from the impeller openings in the circumference of the impeller. A torsion spring is connected at one end to the rotor and at its other end to the driven shaft, permitting any shock due to sudden increase of torque to be absorbed by the backing of the rotor away from the impeller.

Mounted at the top of the housing is a funnel-like fluid collector, having a collecting opening facing the direction of rotation of the impeller, which receives a major portion of the fluid discharged from the impeller chamber through the rotor vanes. Auxiliary vanes mounted on the impeller also splash into the collector fluid which settles to the bottom of the housing. A conduit leads from the bottom of the collector and terminates in a position to discharge fluid into the impeller chamber through an annular opening in a wall of the impeller circumjacent the driving shaft. This conduit is provided with a valve which is actuated from without the housing for controlling the amount of fluid admitted to the impeller chamber. The fluid coupling between the impeller and rotor can be increased or decreased at will simply by varying the flow of fluid from the collector to the impeller chamber. The impeller and rotor are preferably frusto-conical in shape to permit greater decoupling action when the rotor backs away from the impeller.

A second species of this invention is embodied in a simpler and more compact device in which the housing consists of a substantially circular flanged member and a flat cover plate. The impeller in this species is formed of two discs, one of which is dished toward the other and is connected to the other by a plurality of circumferential spacing members which permit a sheet of fluid, impelled by centrifugal force, to escape at the circumference of the impeller from the chamber formed by the two discs.

Particular embodiments of the instant invention have been illustrated in the accompanying drawings, wherein:

Fig. 4 is a longitudinal section of an embodiment of the instant invention taken on line 4—4 of Fig. 5; and Fig. 5 is a section taken on line 5—5 of Fig. 4.

Figure 1:
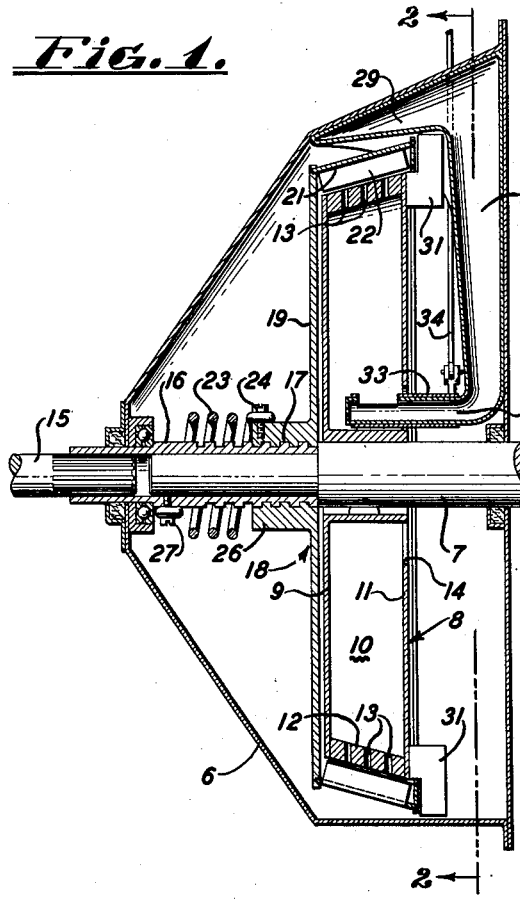
Fig. 1 is a longitudinal cross section of a preferred embodiment of the instant invention taken on line 1—1 of Fig. 2.
Figure 2:
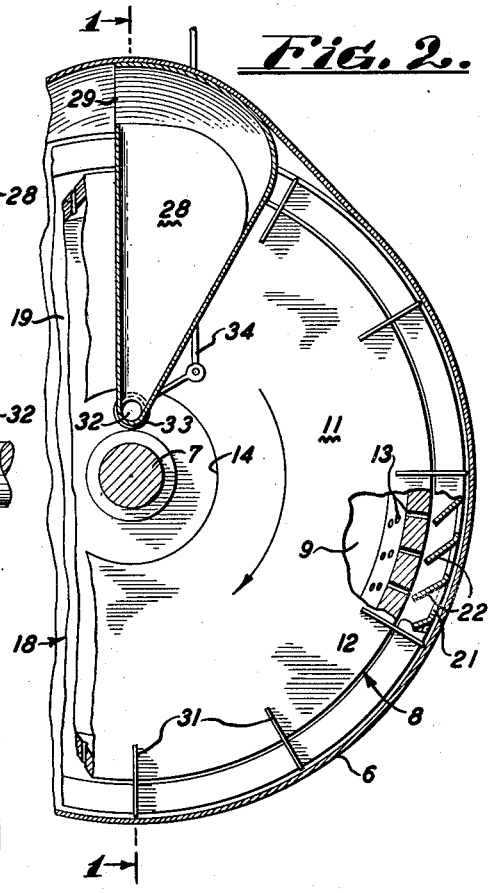
Fig. 2 is a section taken on line 2—2 of Fig. 1, and broken away to show the vanes.
Figure 3:
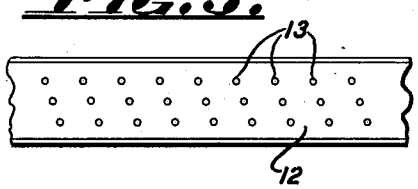
Fig. 3 is a developed view of the circumference of the impeller, showing the arrangement of impeller openings.

Referring to Figs. 1 and 2 of the drawings, numeral 6 designates a fluid tight housing. Mounted in the housing is a driving shaft 7. An impeller 8, keyed to the driving shaft, is formed of a pair of axially spaced circular members 9 and 11, connected at their circumferences by an annular member 12, thus forming an impeller chamber 10. The annular member is provided with openings 13 to permit the discharge of fluid from the impeller chamber 10. The circular member 11 has an annular opening 14 circumjacent the shaft 7. Rotatably mounted on the driving shaft 7 is a sleeve 16, threaded at 17 to be engaged by a threaded rotor 18. The threaded sleeve 16 is splined to receive a driven shaft 15. A circular member 19 of the rotor 18 is adjacent the wall 9 of the impeller. A flange 21, mounted on the circular member 19 of the rotor, extends over the annular connecting member 12 of the impeller. The flange 21 is provided with inclined vanes 22 which react to jets of fluid discharged from the impeller openings on the circumference of the impeller, thereby to couple the rotor 18 to the impeller 8 as the latter rotates. The flange 21 and the vanes 22 are, in this embodiment, formed from a flat strip of material from which the vanes are struck out. A spring 23, connected at one end 24 to the hub of the rotor, and at its other end 27 to the driven sleeve 16, serves to transmit torque from rotor 18 to shaft 15, and acts as a combined torsion and compression spring. As the torque transmitted increases, the rotor 18 screws on the sleeve 16, thereby backing away from the impeller 8 and tending to decouple therefrom. Mounted at the top of the housing 6 is a funnel-like fluid collector 28 having its collecting opening 29 facing the direction of rotation of the impeller 8. Collector 28 receives a major portion of the fluid discharged from the impeller chamber 10 through the rotor vanes 22. Auxiliary vanes 31 mounted on the impeller 8 serve to splash fluid which settles to the bottom of the housing 6 into the collector 28. A conduit 32 leads from the bottom of the collector and terminates in a position to discharge fluid into the impeller chamber 10 through the annular opening 14. This conduit 32 is provided with a valve 33 actuated by the control rod 34 from without the housing 6 to selectively restrict the amount of fluid admitted into the impeller chamber 10 from collector 28. In this manner the coupling between the impeller 8 and rotor 18 can be increased or decreased externally at will by varying the fluid supply. The impeller 8 and rotor 18 are, in this embodiment, frusto-conical in shape to provide greater decoupling action between the member 12 of the impeller 8 and the flange 21 and vanes 22 of the rotor, when the rotor backs away from the impeller.

*Operation*

In operation, a supply of fluid resting at the bottom of the housing 6 is splashed into the collector 28 by the splash vanes 31, upon rotation of the impeller 8. No appreciable coupling between the impeller and rotor is possible until a supply of fluid is admitted from the collector 28 into the impeller chamber 10. Fluid admitted into the impeller chamber 10 is whirled by the rotation of the impeller and discharged by centrifugal force through the openings 13 of the impeller 8 against the rotor vanes 22 of the rotor 18, causing the rotor to drive the shaft 15 through the torsion spring 23. Use of the torque transmitting spring 23 serves in effect to limit the torque that can be transmitted; because as the torque begins to stress the spring, the rotor 18 backs away from the impeller 8 thereby tending to decouple the members. When there is a sudden increase of torque on the driven rotor 18, the rotor backs away from the impeller on the thread 17, thereby decreasing the coupling. In this manner the prime mover driving the shaft 7 can operate at a substantially steady power output irrespective of the torque load on the shaft 15.

It will be noted that the chamber-like construction of the impeller 8 results in a device in which the coupling is substantially unidirectional, that is, turning of the rotor faster than the impeller will not produce a back flow of power, because the coupling is produced almost completely by the centrifugal action of the spinning impeller upon the fluid contained therein, which creates coupling jets of fluid thrown out of the impeller against the rotor.

*Modification*

A second species of this invention, Figs. 4 and 5, shows a simpler and more compact device in which the fluid tight housing consists of a substantially circular flanged member 36 and a flat cover plate 37. The impeller 38 in this species is formed of two discs, one of which, 39, is dished towards the other, 41, and is connected thereto by a plurality of spacing members 42, leaving an annular slit-like opening 43 between the two discs 39 and 41, which permits a sheet of fluid impelled by centrifugal force to escape at the circumference of the impeller from the chamber 44, formed between the two discs. As in the first species, the disc 39 has an annular opening 46 circumjacent the driving shaft 47 to permit discharge, through a connecting conduit 45, of fluid from a fluid collector 48 mounted at the top of the housing into the impeller chamber 44. The fluid collector 48 has its collecting opening 49 facing the direction of rotation of the impeller, and is filled by means of splash vanes 51 mounted on the impeller 38. The rotor 52 adjacent the disc 41 of the impeller has an integral, vaned flange 53, circumjacent the impeller and in position to receive the sheet of fluid discharged from the impeller chamber 10. The rotor 52 is preferably integral with the driven shaft 54.

The operation of this species is similar to that of the preferred embodiment. This species particularly shows the adaptability of this device for small, compact units, and economical manufacture.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed is:

1. In a hydraulic power transmitting device, a driving shaft having an impeller, a driven shaft mounted coaxially with said driving shaft, a rotor threaded to said driven shaft, and a torsion spring connected at one end to said rotor and at its other end to said driven shaft, whereby increased torque on said spring causes screwing of said rotor on said driven shaft and backing away of said rotor from said impeller, thereby tending to decouple said rotor from said impeller.

2. A hydraulic coupling comprising a drive shaft, an impeller fixed to the drive shaft and including axially spaced plates and an annular member connecting the plates at their periphery and formed with fluid passages for discharge of fluid centrifugally ejected from the impeller, one of said plates being provided with an annular opening circumjacent said shaft, a driven shaft coaxial with said drive shaft, a rotor mounted on said driven shaft and including vanes positioned in the path of the discharged fluid to be driven thereby, a housing enclosing said impeller and rotor, a fluid collector having an inlet in the upper portion of said housing and an outlet discharging through said annular opening into the rotor, and power means for moving fluid from the lower portion of said housing to the fluid collector inlet.

3. A hydraulic power transmitting device comprising a drive shaft, an impeller fixed to the shaft and including a chamber formed by two axially spaced walls and an annular ring connecting said walls at their peripheries and formed with fluid discharging apertures, an annular opening in one of said walls circumjacent said shaft, a driven shaft coaxial with said drive shaft, a rotor mounted on said driven shaft and including an annular flange having vanes overlying the apertures of said annular ring to be driven by fluid discharged therefrom, a housing enclosing the impeller and rotor, a fluid collector mounted in the upper portion of said housing having a collecting opening facing the direction of rotation of said impeller and an outlet discharging through said annular opening into said chamber, valve means operable from outside said housing to control the flow of fluid from said collector into said chamber, and splash vanes mounted on said impeller to supply fluid to said collector.

4. A hydraulic coupling comprising an impeller designed to be coupled to a drive shaft and having a radial passage with an outlet at the periphery of the impeller for centrifugally ejecting liquid therefrom, a driven shaft, a rotor threaded to said driven shaft, vanes on said rotor in the path of the ejected liquid to be driven thereby, and a torsion spring connected at one end to said rotor and at its other end to said driven shaft whereby increased torque on said spring causes the rotor to back away from the impeller and move said vanes partially or wholly out of said path.

5. A hydraulic coupling comprising an impeller having a radial passage with its outlet at the periphery of the impeller for centrifugally ejecting liquid therefrom, a driven shaft, a rotor threaded to said shaft and having vanes normally disposed in the path of the ejected liquid to be driven thereby, a torsion spring connecting the rotor and the driven shaft to hold the vanes normally in the path of the ejected liquid but yieldable upon increasing torque reaction on the rotor to cause the shaft to lag behind the rotor and to cause the vanes to move axially of said shaft partially or wholly out of said path.

6. A hydraulic coupling comprising an impeller having a radial passage with a peripheral outlet for centrifugally ejecting liquid therefrom, a driven shaft, a rotor on said shaft, a cam connecting the shaft and rotor to move the rotor longitudinally of the shaft upon relative rotation therebetween, vanes on the rotor normally disposed in the path of the ejected liquid to be driven thereby, and a spring urging the rotor into normal position relative to the impeller but yieldable upon increased torque reaction on the rotor to cause the rotor to move angularly and axially relative to the impeller and thereby to cause the vanes to move partially or wholly out of the path of the ejected liquid.

7. The invention defined in claim 6, comprising in addition means including splash vanes actuated by the impeller for returning ejected liquid to the radial passage.

8. A hydraulic coupling comprising an impeller having a radial passage with a peripheral outlet for centrifugally ejecting liquid therefrom, a driven shaft, a rotor on said shaft, cam means connecting the shaft and rotor to move the rotor longitudinally of the shaft upon relative rotation therebetween, vanes on the rotor normally disposed in close proximity to said outlet to be driven by the liquid ejected therefrom, a spring urging the rotor toward the impeller to maintain the vanes in normal position but yieldable upon increased torque to permit the rotor to move in the opposite direction, said vanes being inclined toward the axis of the shaft in said opposite direction so that movement of the rotor in said opposite direction separates the vanes radially from said outlet as well as axially.

9. The invention defined in claim 8, wherein said spring is a combined torsion and compression spring, and said cam means are of such sense that movement of the rotor in said opposite direction causes the shaft to lag angularly behind the rotor.

10. A hydraulic coupling comprising an impeller formed with a frusto-conical periphery and having a radial passage with a peripheral outlet for centrifugally ejecting liquid therefrom, a driven shaft, a rotor axially movable on said shaft and formed with a frusto-conical periphery comprising axially inclined blades normally positioned in overlying nested relation to the periphery of the impeller, and a combined torque and compression spring for urging the rotor to normal position but yieldable upon increase of rotor torque to cause the rotor to back away from the impeller, thereby tending to decouple the rotor from the impeller.

11. A rotary hydraulic coupling comprising a drive shaft, an impeller fixed to said shaft and comprising two axially spaced plates and an annular ring connecting the plates at their periphery and formed with radial liquid passages for centrifugally ejecting liquid therefrom, a rotor having inclined vanes in the path of the ejected liquid to be driven thereby, a stationary housing enclosing the propeller and rotor, a liquid collector having an inlet opening in the upper portion of the housing and an outlet discharging in said passage anterior to the passage outlet, and vanes on the impeller for moving liquid from the interior of the housing to the liquid collector inlet.

HENRY WIRZ.

References Cited in the file of this patent

UNITED STATES PATENTS

| Number | Name | Date |
|---|---|---|
| 1,047,948 | Karminski et al. | Dec. 24, 1912 |
| 1,616,252 | Bratvold | Feb. 1, 1927 |
| 2,006,136 | Grimsley | June 25, 1935 |
| 2,129,366 | Swennes | Sept. 6, 1938 |
| 2,190,830 | Dodge | Feb. 20, 1940 |
| 2,343,786 | Martin | Mar. 7, 1944 |
| 2,359,930 | Miller | Oct. 10, 1944 |
| 2,404,900 | Carlson | July 30, 1946 |
| 2,533,544 | Zavarella | Dec. 12, 1950 |
| 2,539,004 | Becker | Jan. 23, 1951 |